Patented Oct. 10, 1950

2,524,856

UNITED STATES PATENT OFFICE 2,524,856

PIPERIDO-PHENANTHRENE DERIVATIVES AND METHOD FOR THEIR PRODUCTION

Otto Schnider and André Grüssner, Basel, Switzerland, assignors to Hoffmann-La Roche Inc., Nutley, N. J., a corporation of New Jersey No Drawing. Application January 24, 1948, Serial No. 4,218. In Switzerland January 30, 1947

7 Claims. (Cl. 260—286)

This invention relates to a process for the manufacture of piperido-phenanthrene derivatives Morphine (Formula I), a constituent of opium, is a valuable medicine consequent to its biological properties. It has now been found that derivatives of piperido-octahydrophenanthrene carrying substituents, in the first place one or more hydroxy radicals, in the aromatic nucleus (Formula II) are characterized by their ability to exert morphine-like activity.

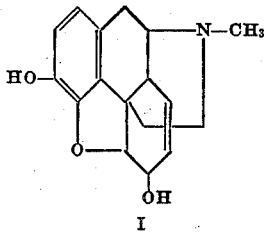

I

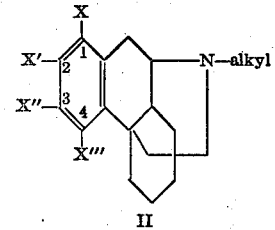

II

In Formula II at least one of the radicals X(X',X'',X''') stands for a hydroxy or an amino radical or a functional derivative thereof, while the other symbols X either also represent a radical as above defined or stand for hydrogen or an alkyl radical.

According to the present invention the process for the manufacture of compounds of Formula II is characterized by nitration of a piperido-octahydrophenanthrene of the general Formula III

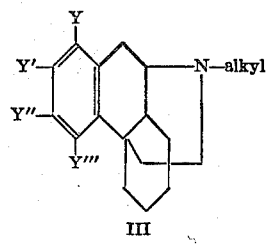

III wherein at least one of the radicals

Y(Y',Y'',Y''')

symbolises hydrogen while the other symbols stand for either hydrogen or a hydroxy or an amino radical or a functional derivative of the latter two or an alkyl radical. If a piperido-octahydrophenanthrene compound unsubstituted in the aromatic nucleus (Y=Y'=Y''=Y'''=H) is used as starting material, two mononitro compounds are formed by nitration; they may be easily separated from one another consequent to the difference in solubility of their picrates. One of the two compounds has been ascertained to carry the nitro radical in position 3 while the other one probably carries the nitro group in position 2 or 4. The nitration may, however, also be effected by using piperido-octahydrophenanthrene of the general Formula III carrying substituents in the aromatic nucleus as starting materials provided at least one of the substituents Y(Y',Y'',Y''') is hydrogen.

When reduced the nitro derivatives are transformed into amino compounds from which, if so desired, functional derivatives may be obtained. By diazotising and heating, the well crystallised hydroxy-derivatives of piperido-octahydrophenanthrene are obtained from the amino compounds. The hydroxy-derivatives may be transformed into the corresponding esters or ethers by acylation or alkylation, respectively. All these piperido - octahydrophenanthrene derivatives form salts with acids, these salts partly being easily soluble in water.

By the process above described piperido-octahydrophenanthrene derivatives carrying one or more substituents in the aromatic nucleus are obtained. Among these compounds those carrying an amino group or a functional derivative thereof have proved to be biologically active. Piperido - octahydrophenanthrene derivatives substituted in the aromatic nucleus by one or more hydroxy groups which may be etherized or esterified have proved to possess especially high morphine-like activity; thus, for instance, 1'-methyl - piperido - [2',3',4':9,14,13] - 3 - hydroxy - 5,6,7,8,9,10,13,14 - octahydrophenanthrene and the esters and ethers thereof are well suitable for therapeutic use. The products of the present process are also useful as intermediates in the preparation of other compounds with valuable pharmacological properties.

The starting materials of Formula III may be obtained by transforming 1,3-di-hydroxy-5,6,7,8-tetrahydro-isoquinoline (U. Basu, Journ. Indian Chem. Soc. 8 [1931] page 319) into the corresponding 1,3 - dichloro-compound, preparing therefrom 5,6,7,8-tetrahydro-isoquinoline by the aid of catalytically activated hydrogen and transforming the same into 1-aralkyl-2-alkyl-1,2,5,6,7,8-hexahydro-isoquinoline in analogy to the method described for isoquinoline (M. Freund, Bode, B.42 [1909] page 1750); catalytic hydrogenation of the said compound yields the octahydro compound which on warming with phosphoric acid is transformed into the corresponding piperido-octahydrophenanthrene derivative (1'-alkyl-piperido-[2',3',4':9,14,13]-5,6,7,8,9,10,13,14-octahydrophenanthrene). Furthermore, all piperido-octahydrophenanthrene derivatives obtained, in accordance with the present process, by nitration and subsequent transformation of the nitro group may also be used as starting materials of Formula III on the condition however, as stated above, that at least one of the radicals Y(Y,Y', Y'',Y''') is hydrogen.

*Example 1*

A cold mixture of 700 parts by volume of glacial acetic acid and 1200 parts by volume of fuming nitric acid of almost 100 per cent. are added dropwise while stirring and cooling to under +10° C. to 241 parts by weight of 1'-methyl-piperido-[2',3',4':9,14,13]-5,6,7,8,9,10,13,14-octahydrophenanthrene. The dropping in must be so regulated that the temperature does not rise over +10° C. After completion of the addition the mixture is left to stand for 24 hours during which time it gradually assumes room temperature.

The mixture is then poured onto 2000 parts by weight of ice and set weakly alkaline to phenolphthalein by means of concentrated ammonia while stirring and cooling. Thereby a yellow oil precipitates which is taken up in benzene and separated therefrom by distillation. The residue consisting of about 250 parts by weight of a mixture of two nitro-compounds is dissolved in 250 parts by volume of acetone. The solution is poured into a solution of 250 parts by weight of picric acid in 100 parts by volume of acetone. About 250 parts by weight of a picrate of melting point 248° C., which is very difficultly soluble in acetone, crystallize if the solution is left to stand or, more quickly, if it is inoculated. On warming with hydrochloric acid, extracting with ether, concentrating in vacuo and recrystallizing from water 1'-methyl-piperido-[2',3',4':9,14,13]-3-nitro-5,6,7,8,9,10,13,14-octahydrophenanthrene hydrochloride of melting point 268° C. is obtained.

350 parts by weight of this nitro compound are dissolved in 1500 parts by volume of water and hydrogenated under normal pressure in the presence of palladium charcoal (in quantity corresponding to 3,5 parts by weight of palladium). Hydrogen is easily taken up while the temperature of the reaction mixture rises by itself. After separation from the catalyst the solution is set weakly alkaline to phenolphthalein by addition of ammonia and the precipitated amino compound is taken up in benzene. The latter is distilled off and the residue is dissolved in and recovered from petroleum ether of high boiling point. The 1'-methyl-piperido-[2',3',4':9,14,13]-3-amino-5,6,7,8,9,10,13,14-octahydrophenanthrene thus obtained has its melting point at 114–115° C.

On warming this compound with acetic anhydride 1'-methyl-piperido-[2',3',4':9,14,13]-3-acetamino-5,6,7,8,9,10,13,14-octahydrophenanthrene is obtained, the hydrobromide of which crystallized with water and melts at 113–116° C.

256 parts by weight of 1'-methyl-piperido-[2',3',4':9,14,13]-3-amino-5,6,7,8,9,10,13,14-octahydrophenanthrene are dissolved in 2000 parts by volume of 3 normal sulphuric acid and the mixture is cooled to 0–5° C. while stirring. It is then diazotised by slowly dropping in a solution of 69 parts by weight of sodium nitrite in 300 parts of water. The cold diazo solution is allowed to flow, in the form of a thin stream, while stirring, into a mixture of 1500 parts by volume of concentrated sulphuric acid and 1500 parts of water warmed to 60–70° C. Nitrogen immediately escapes. After termination of the inflow the mixture is heated for ½ hour during which the temperature is gradually raised to 80° C. It is then cooled, poured on ice and set weakly alkaline to phenolphthalein by the addition of ammonia having a concentration of about 20 per cent. The basic hydroxy compound which precipitates is sucked off, washed with water and transformed into the hydrobromide by addition of hydrobromic acid. After recrystallisation from water the hydrobromide melts at 193–195° C. By precipitation with soda solution 1'-methyl-piperido-[2',3',4':9,14,13]-3-hydroxy-5,6,7,8,9,10,13,14-octahydrophenanthrene melts at 251–253° C.

By methylation this compound is transformed into 1'-methyl-piperido-[2',3',4':9,14,13]-3-methoxy-5,6,7,8,9,10,13,14-octahydrophenanthrene of melting point 81–83° C., the hydrobromide thereof melting at 91–93° C. The hydrobromide of the corresponding 3-acetoxy compound has its melting point at 210–212° C., with crystal water at 155–159° C.

*Example 2*

The acetone solution obtained by the process described in Example 1 after separating off the picrate of 1'-methyl-piperido-[2',3',4':9,14,13]-3-nitro-5,6,7,8,9,10,13,14-octahydrophenanthrene is concentrated until a thick mass of crystals has formed. By sucking off and washing with acetone a picrate of melting point 207–209° C. is obtained which is comparatively easily soluble in acetone. By treatment with hydrochloric acid and ether a further 1'-methyl-piperido-[2',3',4':9,14,13]-2(or 4)-nitro-5,6,7,8,9,10,13,14-octahydrophenanthrene-hydrochloride is obtained. It may be recrystallised from alcohol, ether or water and melts at 265° C.

The reduction thereof may be carried out as scribed in Example 1 and yields the amino compound in the form of a base melting at 135–137° C. The acetyl derivative prepared therefrom melts at 134–135° C. with previous sintering.

By diazotizing and heating the amino compound in accordance with the indications in Example 1, 1'-methyl-piperido-[2',3',4':9,14,13]-2(or 4)-hydroxy-5,6,7,8,9,10,13,14-octahydro-phenanthrene of melting point 93–95° C. is obtained. It is difficultly soluble in water and hardly soluble in alcohol and ether, insoluble in soda solution and easily soluble in sodium hydroxide solution. The hydrobromide thereof melts at 154–156° C. after recrystallisation from water.

*Example 3*

298 parts by weight of 1'-methyl-piperido-[2',3',4':9,14,13]-3-acetamino-5,6,7,8,9,10,13,14-octahydrophenanthrene, as described in Example 1, are dissolved in 600 parts by volume of glacial acetic acid and are stirred in ice water while cooling. A solution of 1500 parts by volume of 100 per cent. nitric acid in 900 parts by volume of glacial acetic acid are added dropwise. The said addition is regulated in such a manner to prevent the temperature from rising above 10° C. The mixture is subsequently left to stand without further cooling for 24 hours, and is then concentrated in vacuo until the excess nitric acid and the glacial acetic acid are removed practically completely. The slightly yellowish residue is set weakly alkaline with ammonia while stirring and cooling. The nitro base of the formula $C_{19}H_{25}O_3N_3$ which precipitates is recrystalised from dilute methanol. The melting point thereof is at 160–162° C.

343 parts by weight of 1'-methyl-piperido-[2',3',4':9,14,13]-3-acetamino-2(or 4)-nitro-5,6,7,8,9,10,13,14 - octahydrophenanthrene are refluxed for 3 hours with 3400 parts by volume of 48 per cent. hydrobromic acid. Excess hydrobromic acid is removed by concentration in vacuo, the hydrobromide thus obtained is dissolved in warm water, the solution is treated with charcoal and then set weakly alkaline with 3 N ammonia. The 1' - methyl - piperido - [2',3',4':9,14,13]-3-amino-2(or 4)-nitro-5,6,7,8,9,10,13,14-octahydrophenanthrene ($C_{17}H_{23}O_2N_3$) is recrystallised from dilute acetone or dilute methanol. Its melting point is at 173–174° C.

The said compound is dissolved in methanol and hydrogenated in the presence of palladium charcoal. After recrystallisation from benzol petroleum ether mixture the 1'-methyl-piperido [2',3',4':9,14,13]-2(or 4), 3-diamino-5,6,7,8,9,10,13,14-octahydrophenanthrene ($C_{17}H_{25}N_3$) melts at 76–78° C.

The fact that the 2 amino groups are in o-position is proved by the following experiment: The compound when boiled with the theoretical quantity of phenanthrenequinone practically quantitatively yields the corresponding pyrazine derivative ($C_{31}H_{29}N_3$) with a melting point of 258–260° C.

*Example 4*

By treatment, in accordance with Example 3, of 1'-methyl-piperido-[2',3',4':9,14,13]-2(or 4)-acetamino - 5,6,7,8,9,10,13,14 - octahydrophenanthrene, described in Example 2, the following compounds are obtained:

1'-methyl-piperido-[2',3',4':9,14,13]-2(or 4)-acetamino - 3 - nitro - 5,6,7,8,9,10,13,14 - octahydrophenanthrene ($C_{19}H_{25}O_3N_3$), having, after recrystallisation from dilute methanol, a melting point of 106–109° C.

1'-methyl-piperido-[2',3',4':9,14,13]-2(or 4)-amino-3-nitro-5,6,7,8,9,10,13,14-octahydrophenanthrene ($C_{17}H_{23}O_2N_3.H_2O$) having, after recrystallisation from dilute acetone, its melting point at 110–112° C.

From the said amino nitro compound 1'-methyl - piperido - [2',3',4':9,14,13] - 2(or 4), 3 - diamino - 5,6,7,8,9,10,13,14 - octahydrophenanthrene may be obtained by catalytic hydrogenation; the melting points of this compound and of the mixture thereof with the product of Example 3, as well as the properties of the product of the condensation of the compound named above with phenanthrene-quinone prove that the final product of the present example is identical with the product of Example 3.

*Example 5*

An ice cooled solution of 257 parts by weight of 1'-methyl-piperido-[2',3',4':9,14,13]-3 - hydroxy - 5,6,7,8,9,10,13,14 - octahydrophenanthrene in 1250 parts by volume of glacial acetic acid are mixed with 220 parts by weight of an ice cooled solution of 65 per cent. nitric acid in 1250 parts by volume of glacial acetic acid. The mixture is left to stand for 30 minutes in ice water and then for 4 hours at room temperature, thereby warming slightly and turning yellow brown gradually. The glacial acetic acid is then removed by concentration in vacuo, the brown residue is poured on ice and set weakly alkaline with 3 N ammonia. The base thus precipitating is dissolved with aqueous hydrobromic acid, the solution is treated with charcoal and then concentrated in vacuo, whereby the hydrobromide of 1'-methyl-piperido-[2',3',4':9,14,13]-3-hydroxy-2(or 4)-nitro - 5,6,7,8,9,10,13,14-octahydrophenanthrene ($C_{17}H_{23}O_3N_2Br.½H_2O$), which is only little soluble in water, precipitates. It may be recrystallised from warm water or alcohol ether mixture and melts at 200–201° C.

By catalytic hydrogenation it is transformed into the corresponding hydroxy amino compound.

By treating 1'-methyl-piperido-[2',3',4':9,14,13]-3-hydroxy - 5,6,7,8,9,10,13,14 - octahydrophenanthrene with an excess quantity of 100 per cent. nitric acid 2 nitro groups are introduced into the aromatic nucleus.

By treating in an analogous manner 1'-methyl-piperido-[2',3',4':9,14,13]-2(or 4)-hydroxy-5,6,7,8,9,10,13,14-octahydrophenanthrene with the calculated quantity of 65 per cent. nitric acid a dinitro product is obtained, the hydro-bromide of which ($C_{17}H_{22}O_5N_3Br$) dissociates on boiling with water, but which may be recrystallised from a methanol ether mixture and which does not melt by heating to 350° C.

By catalytic hydrogenation, in the presence of palladium charcoal, of the said compound in methanol solution the corresponding diamino-hydroxy compound is obtained, the trihydrobromide of which ($C_{17}H_{28}ON_3Br_3.3H_2O$) melts at 242–245° C.

*Example 6*

200 parts by weight of 1'-methyl-piperido-[2',3',4':9,14,13]-3-methoxy-5,6,7,8,9,10,13,14 - octahydrophenanthrene of melting point 81–83° C., as described in Example 1, are dissolved in 2000 parts by volume of glacial acetic acid. 160 parts by volume of nitric acid ($d=1.4$) are added in the course of about 15 minutes while cooling with ice and stirring, after completion of the addition the solution is heated to 40° C. whereby it turns yellow and then brown. After lapse of 30 minutes the mixture is poured on ice and set weakly alkaline with ammonia. The somewhat sticky precipitate is filtered by suction and dissolved in methanol. On addition with ether 1'-methyl-piperido-[2',3',4':9,14,13] - 3 - methoxy-dinitro-5,6,7,8,9,10,13,14-octahydrophenanthrene ($C_{18}H_{23}O_5N_3.H_2O$)

melting at 235–237° C., precipitates.

*Example 7*

51 parts by weight of 1'-ethyl-piperido-[2',3',4':9,14,13] - 5,6,7,8,9,10,13,14 - octahydrophenanthrene of boiling point 0.2/126–128° C. (obtained by reacting 5,6,7,8-tetrahydro-isoquinoline-bromoethylate with benzylmagnesium-chloride, hydrogenating the reaction product to 1-benzyl-2-ethyl - 1,2,3,4,5,6,7,8 - octahydro - isoquinoline of boiling point 0.08/106° C., the hydrobromide of which melts at 173° C. and the hydrochloride of which melts at 198–200° C., and ring closure with 100 per cent. phosphoric acid at 150° C.) are dissolved under the conditions given in Example 1 in 100 parts by volume of glacial acetic acid and nitrated with 240 parts by volume of fuming nitric acid in 140 parts by volume of glacial acetic acid. After working up in accordance with Example 1 60 parts by weight of the mixture of 2 nitro compounds are obtained.

The said mixture is dissolved in 50 parts by volume of dioxan and then added to a solution of 50 parts by weight of picric acid in 150 parts by volume of dioxan. 50 parts by weight of the picrate of melting point 252-254° C. separate. From the precipitate 1'-ethyl-piperido-[2',3',4':9,14,13]-3-nitro - 5,6,7,8,9,10,13,14 - octahydrophenanthrene-hydrochloride of melting point 252-253° C. are obtained by warming with hydrochloric acid, extracting with ether, concentrating in vacuo and recrystallisation from alcohol.

30 parts by weight of the said nitro compound are dissolved in 150 parts by volume of water and hydrogenated in the presence of palladium charcoal (in a quantity providing for the presence of 0.35 part by weight of palladium). On working up in accordance with Example 1 the 3-amino-compound is obtained; it is a viscous oil, distilling at 140° C. under a pressure of 0.05 mm. Hg.

20.6 parts by weight of 1'-ethyl-piperido-[2',3',4':9,14,13] - 3 - amino - 5,6,7,8,9,10,13,14 - octahydrophenanthrene are diazotised as described in Example 1 and the diazo-compound is transformed in the 3-hydroxy-compound by boiling. The hydrobromide thereof crystallises from water with crystal water and melts at 153-154° C. From an alcohol ether mixture it may be obtained without crystal water and then melts at 268-269° C.

The picrate of the easily dioxane soluble nitro compound may be isolated by distilling off the dioxane; it melts at 214° C. The hydrochloride of the nitro compound, obtained from the picrate in analogous manner, has its melting point at 175-277° C.; by passing through the amino compound it may be transformed into 1'-ethyl-piperido-[2',3',4':9,14,13]-2-(or 4)-hydroxy-5,6,-7,8,9,10,13,14 - octahydro - phenanthrene - hydrobromide of melting point 277-278° C.

*Example 8*

1' - methyl - piperido - [2',3',4':9,14,13] - 1,4-dimethyl - 5,6,7,8,9,10,13,14 - octahydro - phenanthrene (melting point of the hydrobromide 269-270° C.) prepared by condensation of 2.5-dimethyl-benzyl-magnesium-chloride with 5,6,7,8-tetrahydro-isoquinoline-bromomethylate followed by hydrogenation and heating with phosphoric acid is nitrated in glacial acetic acid with nitric acid in accordance with Example 1. The chlorohydrate of the nitro compound obtained, after purification over the picrate (melting point 238-240° C.) and recrystallisation from water melts at 228-230° C. and contains crystal water.

The nitro compound is dissolved in water and reduced to the amino compound with palladium charcoal and hydrogen; the amino compound is diazotised and then boiled to the corresponding hydroxy compound. The hydro bromide of the latter, after recrystallisation from an alcohol-water mixture has its melting point at 313-315° C.; it is little soluble in water, alcohol and acetone and insoluble in ether.

Copending application Ser. No. 773,934, filed September 13, 1947, by the instant inventors, discloses and claims related subject matter.

We claim:

1. A compound selected from the group consisting of 1'-methyl-piperido-[2',3',4':9,14,13]-3-acyloxy - 5,6,7,8,9,10,13,14 - octahydrophenanthrene, the acid addition salts thereof, 1'-methyl-piperido - [2',3',4':9,14,13] - 3-alkoxy - 5,6,7,8,9,-10,13,14-octahydrophenanthrene, and the acid addition salts thereof.

2. 1' - methyl - piperido - [2',3',4':9,14,13] - 3-acetoxy - 5,6,7,8,9,10,13,14 - octahydrophenanthrene hydrobromide.

3. 1' - methyl - piperido - [2',3',4':9,14,13] - 3-methoxy - 5,6,7,8,9,10,13,14 - octahydrophenanthrene.

4. 1' - methyl - piperido - [2',3',4':9,14,13] - 3-methoxy - 5,6,7,8,9,10,13,14 - octahydrophenanthrene hydrobromide.

5. The compound 1'-methyl-piperido-[2',3',-4':9,14,13] - 3 - acetoxy - 5,6,7,8,9,10,13,14 - octahydrophenanthrene.

6. A process which comprises mononitrating 1' - methyl - piperido - [2',3',4':9,14,13] - 5,6,7,8,-9,10,13,14-octahydrophenanthrene, converting the mixture of nitration products to their respective picrates, and recovering the picrate of 1'-methyl-piperido - [2',3',4':9,14,13] - 3 - nitro - 5,6,7,8,9,-10,13,14-octahydrophenanthrene.

7. A process which comprises diazotizing 1' - methyl - piperido - [2',3',4':9,14,13] - 3 - amino - 5,6,7,8,9,10,13,14 - octahydrophenan - threne and hydrolyzing to produce 1'-methyl-piperido - [2',3',4':9,14,13] - 3 - hydroxy - 5,6,-7,8,9,10,13,14-octahydrophenanthrene.

OTTO SCHNIDER.
ANDRÉ GRÜSSNER.

REFERENCES CITED

The following references are of record in the file of this patent:

Small: "Chemistry of the Opium Alkaloids" (U. S. Government Printing Office, 1932), pp. 241 and 246.

Sidgwick: "Organic Chemistry of Nitrogen" (2nd edition; Oxford University Press; 1937), pp. 404 and 405.